US005678037A

United States Patent [19]

Osugi et al.

[11] Patent Number: 5,678,037

[45] Date of Patent: Oct. 14, 1997

[54] HARDWARE GRAPHICS ACCELERATOR SYSTEM AND METHOD THEREFOR

[75] Inventors: Kevin J. Osugi, Gilbert, Ariz.; Darrell J. Starnes, Tomball, Tex.

[73] Assignee: VLSI Technology, Inc., San Jose, Calif.

[21] Appl. No.: 307,959

[22] Filed: Sep. 16, 1994

[51] Int. Cl.$^{6}$ .......... G06F 13/00

[52] U.S. Cl. .......... 395/525; 395/503; 395/513; 395/523

[58] Field of Search .......... 395/162–166, 395/503, 507, 511, 513, 515, 520, 523–526; 345/185, 190, 121, 126, 127, 191, 200

[56] References Cited

U.S. PATENT DOCUMENTS 5,486,844 1/1996 Randall et al. .......... 345/190

*Primary Examiner*—Kee M. Tung

*Attorney, Agent, or Firm*—Harry M. Weiss; Jeffrey D. Moy; Harry M. Weiss & Associates, P.C.

[57] ABSTRACT

A hardware graphics accelerator (HGA) system which has a source memory element which is loaded to initiate HGA operations operates in two modes: (1) a FIFO mode for normal HGA operations and (2) a recirculate mode for high speed pattern transfers and pattern expands by the HGA. The use of the second mode simplifies the structure and increases the operating speed of the HGA and its associated CPU by eliminating the use of the dedicated pattern registers and pattern control multiplexers of prior art HGA systems.

30 Claims, 3 Drawing Sheets

HARDWARE GRAPHICS ACCELERATOR SYSTEM AND METHOD THEREFOR

BACKGROUND OF THE INVENTION

1. Field of the Invention

This invention relates generally to hardware graphics accelerators used in computer systems and in computer display systems and more specifically to a hardware graphics accelerator (HGA) system and method therefor which accomplishes high speed pattern transfers and pattern expands without the use of the dedicated pattern registers and pattern control multiplexers of prior art HGA systems.

2. Description of the Prior Art

Hardware graphics accelerator (HGA) modules or systems have been commonly used in computer systems incorporating video displays for a number of years. The function of these HGA modules is to speed up the transfer of blocks of digital information from computer system memory to the control electronics and buffer memory portions of the video display hardware so that a particular video image can be displayed more rapidly as compared to the transfer of the same information via the normal non-accelerated memory input-output rate of the computer system. The applicability and advantage of incorporating HGA's has increased rapidly due to the ever increasing use of computer systems which use video displays to show icons or other "window" type information. In non-HGA systems, the heavy demand on the computer system local memory (DRAM) and central processing unit (CPU) required to maintain and update the more extensive video display tended to bog down the computer system as a whole so that not only were updates to the video display slower but the effective speed and availability of the CPU was reduced for all other computing tasks. One approach to solving this problem is to increase the speed and the effective computing rate of the CPU itself so that all computing tasks, including control of the video display are speeded up. The difficulty with this approach is that the CPU is the most complex element of the computing system and upgrading it's total design to increase speed and computing rate is an expensive and time consuming. A simpler and more direct approach is to partition the problem and to handle the maintenance and update of the video display separately with hardware and control software specifically dedicated to this task. The result of this approach is the HGA which can increase the speed of video operations by a factor of two to three times in a direct and cost effective manner. The success of this approach has resulted in the incorporation of some form of HGA in essentially all currently produced computer systems and especially in the portable and desktop personal computer systems which are in wide spread current use.

A feature of prior art HGA's is the incorporation of hardware specifically dedicated to "pattern transfers" and "pattern expands". These pattern manipulations relate to repetitive operations which fill the portion of DRAM defining what is to appear on the video display. For this case, the DRAM locations will contain a particular sequence of "bytes" of information defining the basic elements of the pattern. This sequence is then repeated again and again through the portion of DRAM location corresponding to the repetition of the basic elements of the pattern to "fill" an area of the video display. The dedicated hardware used in prior art HGA's is made up of pattern registers and multiplexer circuits linked to the CPU which controls the HGA.

This set of data is then read out of the pattern registers and steered into the required DRAM locations again and again to "fill" the DRAM locations with the repeating sequence of data corresponding to a patterned area on the video display. In the "pattern expand" variation of these data manipulations, pattern information is stored in "compressed" form in DRAM making use of a specific algorithm which defines how the basic pattern element is to be expanded to the, final form which will be repetitively read from the pattern registers to fill the patterned area on the video display.

The prior art approach of using a dedicated pattern register-multiplexer module within the HGA suffers at least two significant disadvantages: (1) The electrical structure of the HGA block itself must necessarily be larger and more complex in order to incorporate the gates and interconnects required to implement the pattern registers and the associated multiplexers and, (2) CPU program structures and execution times are made longer and more complicated because the module is an additional entity which must be interfaced, controlled and monitored. Thus a need exists for an improved HGA design which accomplishes pattern transfers and pattern expands in a simpler and more cost effective manner.

OBJECTS OF THE INVENTION

Accordingly, it is an object of this invention to provide an improved HGA system and method therefor which accomplishes high speed pattern transfers and pattern expands without the use of the dedicated pattern registers and pattern control multiplexers of prior art HGA systems.

It is a further object of this invention to provide an improved HGA system and method therefor which reduces the number of gates and interconnects required to accomplish high speed pattern transfers and pattern expands.

It is a further object of this invention to provide an improved HGA system and method therefor in which CPU program structures and execution times are made shorter and less complex.

SUMMARY OF THE INVENTION

According to the foregoing objectives, this invention describes an improved HGA system and method therefor which accomplishes high speed pattern transfers and pattern expands by introducing simplified CPU commands and HGA control elements which re-adapt the source FIFO memory used for all HGA functions thereby eliminating the use of the dedicated pattern registers and pattern control multiplexers of prior art HGA systems.

DETAILED DESCRIPTION

Figure 1:
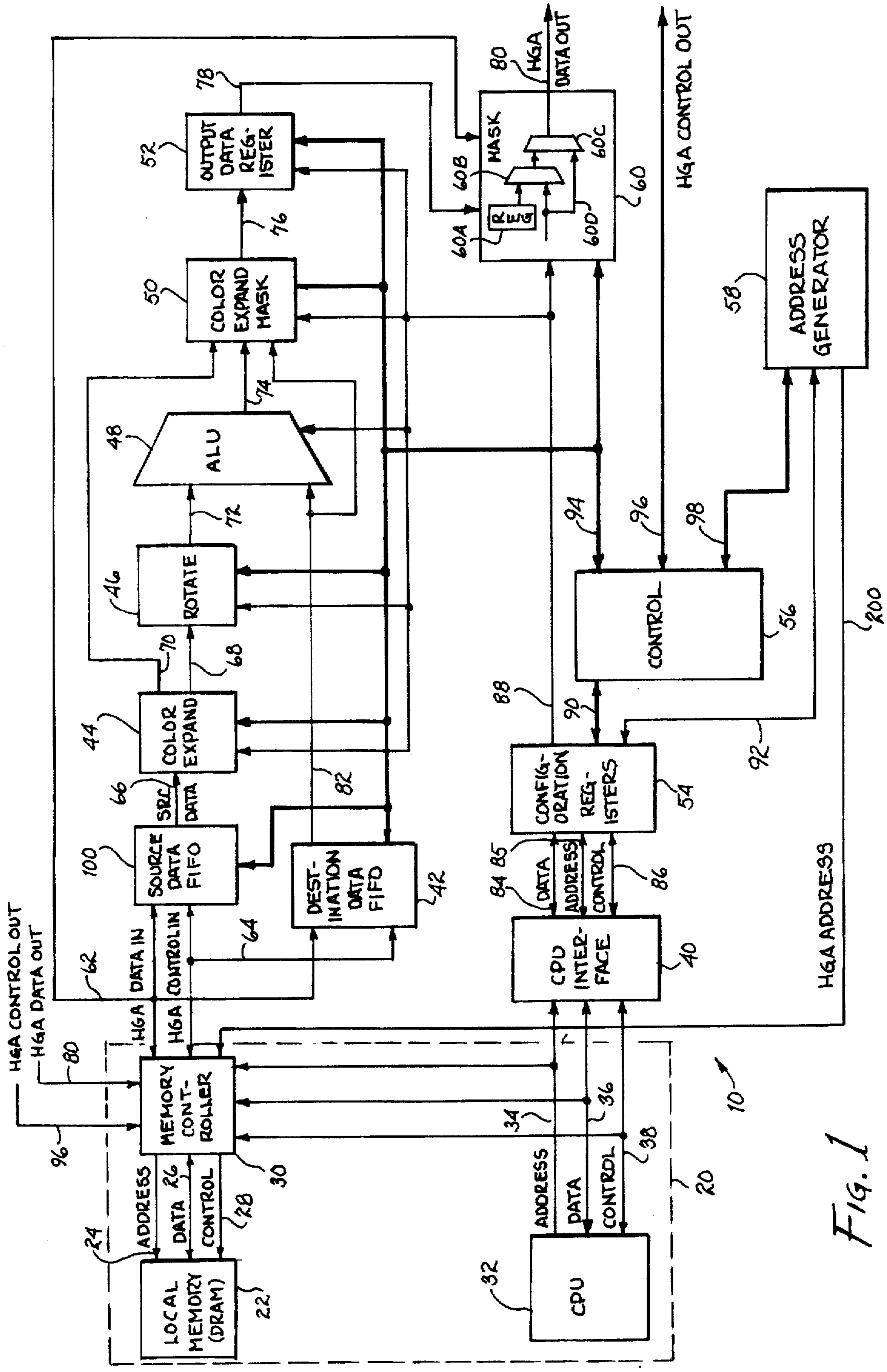
FIG. 1 is a block diagram of the improved HGA system according to the present invention.

FIG. 1 shows a block diagram of HGA 10 according to the present invention. FIG. 1 also shows computer circuitry 20 which is not part of HGA 10 but which comprises the computer elements and interconnecting busses associated with the operation of HGA 10. Computer circuitry 20 comprises DRAM 22 (local memory), memory controller 30, and CPU 32. DRAM 22 is the random access memory for the computer system which contains HGA 10. Memory controller 30 controls access to DRAM 22 by arbitrating the various requests for memory by applying the appropriate address, data and control signals to the memory. CPU 32 is a microprocessor which for this particular embodiment of the present invention is an on-chip intel 386 microprocessor although other microprocessors could be used. Because of its complexity, the actual CPU interface for CPU 10 is not shown in FIG. 1. DRAM 22 couples to memory controller 30 by DRAM address bus 24, bi-directional DRAM data bus 26 and DRAM control bus 28. CPU 32 couples to memory controller 30 via CPU address bus 34, CPU data bus 36 and CPU control bus 38. CPU address bus 34, CPU data bus 36 and CPU control bus 38 also couple to CPU interface 40 which is part of HGA 10 as will be described in detail in the descriptions which follow.

As shown in FIG. 1, HGA 10 comprises source data FIFO 100, destination data FIFO 42, color expand module 44, rotate module 46, ALU (arithmetic logic unit) 48, color expand mask 50, output data register 52, configuration registers control module 56, address generator 58 and mask 60. Source data FIFO 100 couples to memory controller 30 via HGA data in bus 62 which also couples to destination data FIFO 42 and mask 60. Source data FIFO 100 also couples to memory controller 30 via HGA control in bus 64 which also couples to destination data FIFO 42. Source data FIFO 100 also couples to color expand module 44 via SRC data bus 66. Color expand module 44 couples to rotate module 46 via bus 68 and couples to color expand mask 50 via bus 70. Rotate module 46 couples to ALU 48 via bus 72. ALU 48 couples to color expand mask 50 via bus 74. Color expand mask 50 couples to output data register 52 via bus 76. Output data register 52 couples to mask 60 via bus 78. Mask 60 couples to memory controller 30 via HGA data out bus 80. Destination data FIFO 42 couples to ALU 48 and to color mask 50 via bus 82. CPU interface couples to configuration registers 54 via data bus address bus 85 and control bus 86. Configuration registers couples to color expand module 44, rotate module 46, ALU color expand mask 50, output data register 52 and mask 60 via configuration data bus 88. Configuration data bus 88 is a static bus which must remain fixed throughout a given operation. Configuration registers 54 also couples to control module 56 via bus 90 and to address generator 58 via bus 92. Control module 56 couples to source data FIFO 100, destination data FIFO 42, color expand module 44, rotate module 46, color expand mask 50, output data register 52 and mask 60 via internal control bus 94. Internal control bus is a dynamic control bus which changes state as a given HGA operation progresses. Control module 56 also couples to memory controller 30 via HGA control out bus 96 and to address generator 58 via bus 98. Address generator 58 couples to memory controller 30 via HGA address bus 200. In FIG. 1, the block representing mask 60 includes a pictorial representation which shows a register 60A coupled to an input of first multiplexer 60B whose output couple to an input of second multiplexer 60C. Bus 60D couples to an input of first multiplexer 60B and to an input of second multiplexer 60C. The output of second multiplexer 60C couples to HGA data out bus 80. This pictorial representation is included to assist in visualizing the operation of mask 60 in the detailed descriptions which follow.

The operation of HGA 10 according to the present invention is best understood by first discussing the overall task to be performed. At any moment of time, the next information to be displayed by the video display associated with HGA 10 is contained in a dedicated area of DRAM 22 known as the "video frame buffer". In the video frame buffer, the stored data has a one-for-one correspondence with the pixels (picture elements or dots) of the video display. The number of bits per pixel in the buffer can be varied depending upon the configuration (for example, one bit per pixel for monochrome display or four bits per pixel for color display). The frame buffer data is configured "flat" meaning that as consecutive bytes are read from DRAM by the video controller (not shown), consecutive pixels are sent to the display. The pixels of the video display are commonly visualized as a vertical array of horizontal lines (horizontal rows of pixels). A typical display for HGA 10 would be 480 horizontal lines having 640 pixels per line. Thus the overall function of HGA 10 is to obtain data from various appropriate DRAM locations separate from the video frame buffer, manipulate this data into the correct format (which may include expanding or repeating certain portions of the data) and transmitting the data to the required destination addresses in the video frame buffer.

Computer interface 40 in HGA 10 receives address, data and control signals from CPU 32 thereby allowing CPU 32 to generate input-output (I/O) writes and read to the registers of configuration register module 54. The CPU software uses I/O writes to initialize the configuration registers, defining the operation to be executed by HGA 10. A listing of the main parameters controlled by the registers of configuration register module 54 are as follows:

(1) SRC, source address—a pointer to the area of DRAM where the source data for an operation is located.

(2) DEST, destination address—a pointer to the area of DRAM where the destination data for an operation is located. DEST is an address location in the active video frame buffer area of DRAM from where the video controller (not shown) reads the data to display on the video display.

(3) The number of bits of rotation required to align the SRC data with the DEST data. Rotation refers to shift of data generated as complete bytes of information within HGA 10 into the appropriate single bit locations as DEST data.

(4) The number of bits per pixel required as appropriate for monochrome, shades of gray or color display.

(5) Control bits specifying type of operation, subtype of operation, ALU operations to be performed and other related control information for operating HGA 10.

(6) Foreground and background colors for use in filling the area of the video frame buffer with one color or for color expanding monochrome data at a SRC by transforming a "1" in the SRC data to the foreground color and a "0" in the SRC data to the background color.

(7) Height and width parameters used to define the area to be operated on (how many scan lines high and how many bytes wide).

(8) Startmask and Endmask—values used to prevent modification of individual pixels (or bits within a byte) at the beginning and end of each scan line in the video frame buffer. Because a byte can define up to eight pixels, masking provides a way to modify some pixels within the first and last word (2 bytes) of each scan line. This masking is required because not all operations necessarily occur on byte boundaries.

(9) Pitch—a number used to define the first address of each consecutive scan line. At the end of each scan line, the pitch value is added to the address of the current scan line to generate the address of the next scan line.

(10) Status bits—these bits report when an HGA operation is complete thereby providing the indication to the CPU 32 software to initiate another HGA operation.

Control module 56 receives input from configuration registers 54, address generator 58 and internal control bus 94. All timing and control for each particular HGA operation as well as the HGA control Signals to memory controller 30 are generated within control module 56.

Address generator 58 receives load and increment/decrement commands from control module 56 and receives initial values for SRC and DEST and for the transfer size from the configuration registers. The current values for SRC and DEST are held in address generator 58 and passed via HGA address buss 200 to memory controller 30 at the appropriate times. The value for SRC or the value for DEST (whichever is appropriate) is updated with each memory access. Accesses to DRAM are typically done four at a time in order to fill the four word deep source or destination FIFOs. Accessing four words at a time also improves DRAM bandwidth since the four locations are usually consecutive, allowing "page mode access" available from the DRAM. A transfer size counter within address generator 58 also decrements with each memory access. This count is checked for each access for an end of scan line condition or an end of transfer condition and the information passed back to control module 56.

In order to further describe and explain the operation of HGA 10 according to the present invention, the data flow for the case of a "transparent color expand" will be explained. For this example, a one bit per pixel (monochrome) pattern exists in an "offscreen" (i.e not in the video frame buffer) area of DRAM. This pattern is to be color expanded over a rectangular area of the video frame buffer to result, for example, in a four bit per pixel colored cursor character at the specified location on the video display screen.

The operation begins when CPU 32 initiates all of the appropriate registers and then writes to the "go" bit which is part of configuration registers 54 to start the sequence of actions of control module 56. Address generator 58 loads the SRC address and control module 56 issues a memory read request to memory controller 30. Memory controller 30 will grant access to HGA 10 and will access the correct source data from the SRC address supplied by HGA 10. The source data will be returned to HGA 10 on HGA data in bus 62 together with a "HGA ready" bit which is transmitted as part of HGA control in bus 64. HGA 10 saves this data word in source data FIFO 100. Control module 56 then proceeds by requesting the next data word using the next SRC address and the same sequence of actions. This process continues for four memory accesses until the source data FIFO 100 is full. Control module 56 then removes the memory read request from memory controller 30, thereby allowing other pending CPU requests to be serviced. A short time later, control module 56 loads the DEST address into address generator 58 and again requests memory access from memory controller 30, this time for four words of destination data. The destination data FIFO 42 is filled in the same manner just described for the source data FIFO 100. The first word of data from source data FIFO is available at source data bus 66 for color expand after the source data has been read. Control module 56 causes the address generator 58 to load the destination address in preparation for writing out the new data.

Color expand module 44 takes the sixteen bits of one bit per pixel data (the contents of source data FIFO 100) and expands the first four bits to sixteen bits (a 1:4 color expand) by converting each "1" of the source pattern to the four bit per pixel foreground color and each "0" of the source pattern to the four bit per pixel background color. The data output of color expand module 44 is coupled to rotate module 46 via bus 68. A mask signal is sent from color expand module 44 to color expand mask module 50 via bus 70 for later use.

Rotate module 46 rotates the data from color expand module 44 to the right (corresponding to viewing the video frame buffer as horizontal lines of data scanned from left to right) This allows the data to be aligned with the correct pixel of the destination data. The destination data is not rotated since it is "anchored" in DRAM with each location having a fixed correspondence to a pixel of the video display. As each 16 bits of data pass through rotate module 46, multiplexers rotate the data the correct number of bits as commanded by configuration registers 54 and the bits "rotated out" are registered (re-stored) for rotation to the next 16 bits of data. At the end of a scan line, the saved data is discarded and the background color data is rotated to the first value of the next line.

ALU 48 performs required logical operations (not, and, or, etc.) on the output data from rotate module 46 and the destination data from destination data FIFO 42. These operations allow the pixel manipulation required by the drawing algorithm (the algorithm which controls the configuration of the cursor character of the current example).

Color expand mask 50 blocks out the bits of the output of ALU 48 which are not to be changed. For the current example of "transparent color expand", source data bits which are "0" are required to be unmodified i.e. all "1's" in the source data word are expanded to the foreground color in the destination data word but the destination data word is left unchanged everywhere that a source data "0" has been expanded to the background color. It is this arrangement that makes the color expand "transparent" since result of this masking is that only the "1's" pattern (in this case the drawing of the cursor character) is color expanded while the surrounding background is left unchanged. By way of contrast, an "opaque color expand" would apply both the color expanded foreground color and the color expanded background color. An example might be a "pop-up" menu area of background color showing words of the foreground color. Color expand module 44 has previously transmitted am ask defining which bits to use from ALU 48 and which bits to use from destination data FIFO 42. The correct data is still at the output of destination data FIFO 42 because no read command has been transmitted from control module 56. The mask from color expand module 44 is rotated by the same amount and in the same manner as the source data was previously rotated by rotate module 46 thereby aligning the mask with the data. Multiplexers in the color expand mask are then used to select between data from ALU 48 and destination data FIFO for each of the sixteen bits.

Output data register 52 stores the output of color expand mask 50 at the same time that control module 56 causes color expand module 44 to expand the next four bits of source data and also causes the destination data FIFO 42 to read out the next word of destination data. This process, from the readout of destination data FIFO 42 to storing in output data register 52, take the same amount of time as one access to DRAM through the memory controller. The effect is that no additional delay time is added by these data path operations since the next data is processed while the current data is written to memory.

Mask 60 controls the masking of pixels at the beginning and the end of a video display scan line. All other data passes unchanged through this block but if control module 56 determines that the destination location to be written is the start or the end of a scan line then masking will occur. To mask, control module 56 initiates a read cycle to the current memory location before the write. The read occurs in the same manner as a read to load a FIFO but the data is now saved into a 16 bit mask register 60A in mask 60 and not in an input FIFO. This data is then multiplexed with the data from output data register 52 with selection based on the 16 bit startmask or the 16 bit endmask from configuration registers 54. In FIG. 1, the block for mask 60 includes a pictorial which indicates the general register-multiplexer arrangement by showing register 60A, multiplexers 60B and 60C and interconnect 60D. For simplicity, the entire contents and exact interconnection are not shown. Control module 56 supplies mask 60 with the information of whether to use startmask or endmask for the multiplexing and whether to pass this masked data or the unmasked data directly from output data register 52 as the data transmitted on HGA data out bus 80 to memory controller 30.

The above described operations continue until four words are written in DRAM. Control module then pauses for a short time to prevent monopolizing memory access, reads the next word off of source data FIFO 100, reads in the next four words of destination data into destination data FIFO and repeats. After all of the source data has been used, source data FIFO 100 is refilled along with destination data FIFO and the operation continues. This sequence of operations continues until control module 56 receives a signal from address generator 58 indicating that the transparent color expand is complete for all of the selected area. The "done" bit is then set in the status register in configuration registers 54 and HGA becomes idle.

As mentioned in the initial description of the prior art, a fundamental capability of all HGA systems is the ability to perform "pattern transfers" and "pattern expands". This capability is important because if it is possible to define the required contents of the video frame buffer locations to be a repeating sequence of a single pattern element, the total number of DRAM cycles required to establish these contents in the video frame buffer are essentially cut in half. This improved operation is possible in that once the basic pattern has been established and stored in the HGA hardware, all of the required destination data can be generated and loaded into the video frame buffer locations without making use of DRAM cycles to load and reload the source data FIFO. This provides a double benefit in that not only is the operation of the HGA itself speeded up due to fewer DRAM cycle but the computer system overall is speeded up because more DRAM cycles are available for general use.

Figure 2:
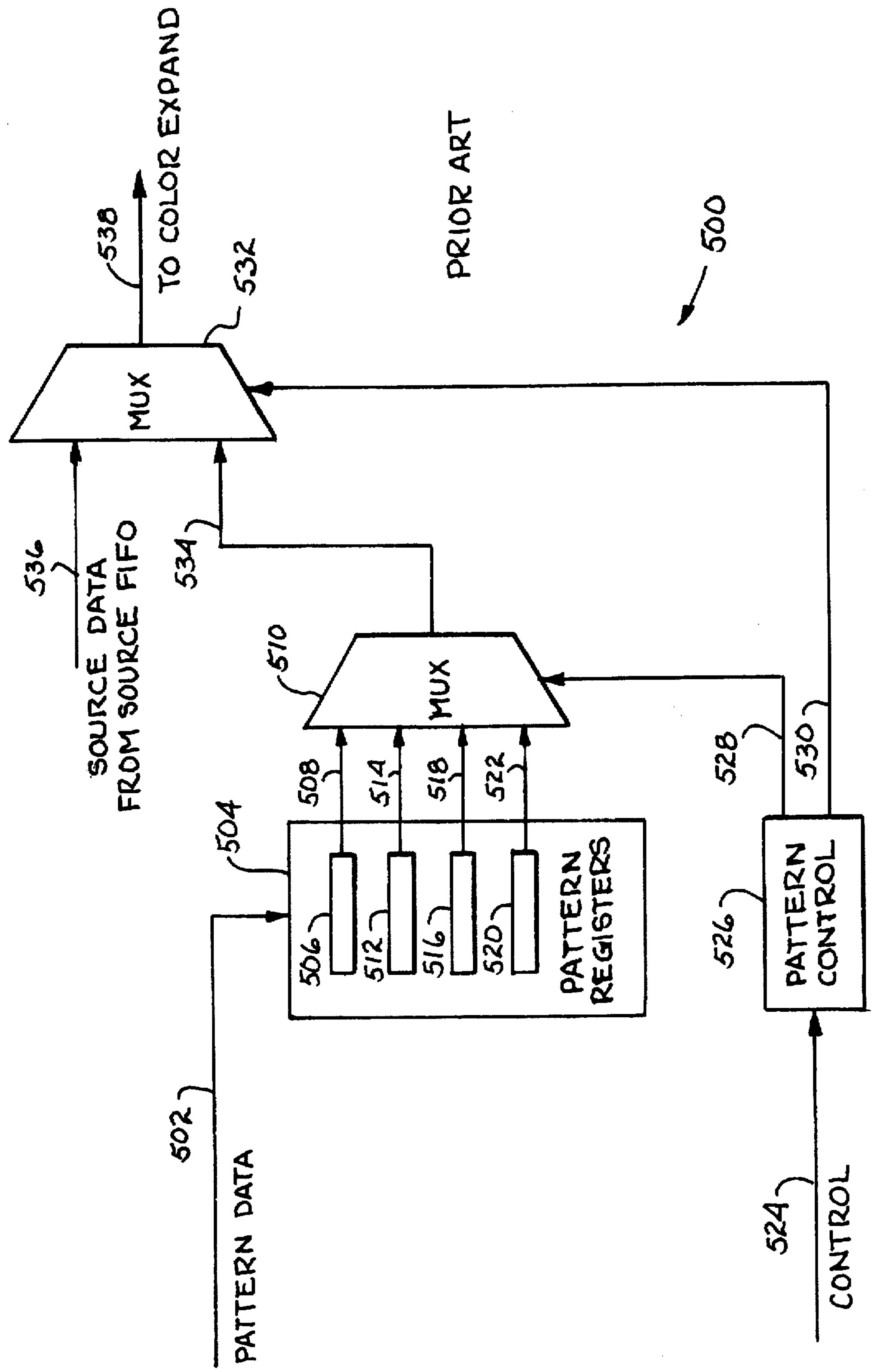
FIG. 2 is a block diagram of the pattern register and pattern multiplexer module used in prior art HGA systems.

As indicated in the initial description, prior art HGA systems have implemented the pattern transfer and pattern expand capability by including dedicated pattern registers and multiplexer as part of the HGA hardware. FIG. 2 shows a representative block diagram describing a typical pattern register and multiplexer hardware module 500 that would be required by prior art HGA systems. In pattern register and multiplexer hardware module 500, a pattern data bus 502 couples to a pattern registers module 504. Pattern registers module 504 contains pattern register 506 which couples to first pattern multiplexer 510 via bus 508, pattern register 512 which couples to first pattern multiplexer 510 via bus 514, pattern register 516 which couples to first pattern multiplexer 510 via bus 518 and pattern register 520 which couples to first pattern multiplexer 510 via bus 522. Pattern control bus 524 couple as an input to pattern control module 526 which has a first MUX control bus 528 coupled to first pattern multiplexer 510 and a second MUX control bus 530 coupled to second pattern multiplexer 532. The output of first pattern multiplexer 510 couples to an input of second pattern multiplexer 532 via bus 534. Another input of second pattern multiplexer 532 couples to source data bus 536. The output of second pattern multiplexer 532 couples to MUX output bus 538. Referring to FIG. 1, if the prior art pattern register and multiplexer hardware module 500 were to be incorporated into HGA 10, source data bus 66 would be removed to allow the output of source data FIFO to couple to source data bus 536 and the input of color expand module 44 to couple to MUX output bus 538. To complete the interconnects, pattern data bus 502 would couple to configuration data bus 88 and pattern control bus 524 would couple to internal control bus 94.

The operation of pattern register and multiplexer hardware module 500 would follow a sequence similar to that previously described for HGA 10. CPU 32 would provide the initial load of the pattern registers via CPU interface 40 and configuration registers 54 into pattern data bus 502. When a pattern transfer or a pattern expand was required, control module 56 would signal pattern control module 526 via pattern control bus 524 to operate second pattern multiplexer 532 so that the input data required for the HGA operating sequence would come from the registers of pattern registers module 504 instead of from source data FIFO 100. This faster mode of operation without DRAM cycles to update source data FIFO would then continue with the repeated access of the pattern registers until the overall pattern expand or pattern transfer was completed.

Although the prior art approach of using a dedicated pattern register-multiplexer module within the HGA allows the stated advantages of having a pattern expand and pattern transfer capability to be accomplished, the approach suffers, as previously discussed, at least two significant disadvantages: (1) The electrical structure of the HGA block itself must necessarily be larger and more complex in order to incorporate the gates and interconnects required to implement the pattern registers and the associated multiplexers and, (2) CPU program structures and execution times are made longer and more complicated because the module is an additional entity which must be interfaced, controlled and monitored. The central concept of the present invention is that an improved HGA design which accomplishes pattern transfers and pattern expands in a simpler and more cost effective manner by making some simple changes in the structure and operation of the source data FIFO 100 as will be shown by the discussion for FIG. 3.

Figure 3:
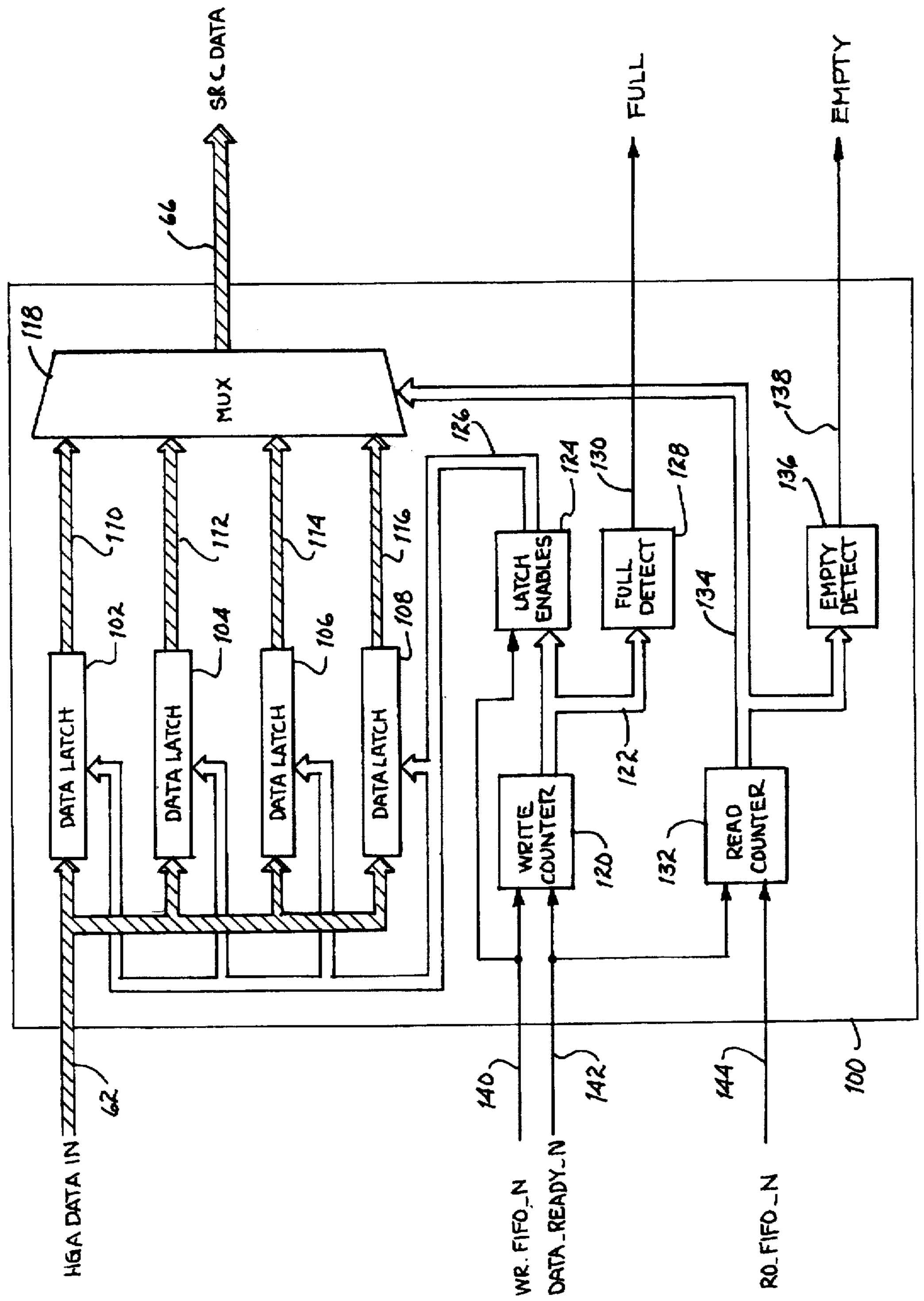
FIG. 3 is a block diagram showing additional details of the Source FIFO module which is part of the improved HGA system according to the present invention.

A detailed block diagram for source data FIFO 100 is shown in FIG. 3. HGA data in bus 62 (a 16 bit wide bus) couples to the inputs to data latch 102, data latch 104, data latch 106 and data latch 108. The output of data latch 102 couples to an input of MUX 118 via bus 110, the output of data latch 104 couples to another input of MUX 118 via bus 112, the output of data latch 106 couples to another input of MUX 118 via bus 114 and the output of data latch 108 couples to another input of MUX 118 via bus 116. The output of MUX 118 couples to SRC data bus 66. Bus WR-FIFO-N 140 (a 1 bit bus) couples to an input to write counter 120 and to an input of latch enable module 124. Bus DATA-READY-N 142 (a 1 bit bus) couples to another input to write counter 120 and to an input to read counter 132. The output of write counter 120 couples via write bus 122 (a 2 bit binary bus) to an input of full detect module 128 and to an input of latch enable module 124. The output of latch enable module 124 couples via enable bus 126 (a 4 bit "one of four select" bus) to inputs to data latch 102, data latch 104, data latch 106 and data latch 108. The output of full detect module 128 couples to full bus 130 (a 1 bit bus) which is part of internal control bus 94. Bus RD-FIFO-N 144 couples to an input to read counter 132. The output of read counter 132 couples to an input to MUX 118 and to an input to empty detect module 136 via read bus 134 (a 2 bit bus). The output of empty detect module 136 couples to empty bus 138 (a 1 bit bus) which is part of internal control bus 94.

Referring to FIG. 1 and FIG. 3, in HGA 10 according to the present invention, source FIFO will operate as a normal FIFO as previously described except during a pattern expand or pattern move command. For these commands, control module 56 will only cause one initial memory read of four values in order to fill the FIFO where the four values are source locations which define a desired pattern. After all of the data has been used, the empty flag (empty bus 138) will be active but will be ignored by control module 56 so that no new data is read into the FIFO. The next assertion of count signal on bus RD-FIFO-N 144 causes read counter 132 to roll over so that the first word location (data latch 102) is once again selected via read bus 134 coupled to MUX 118 so that the pattern will be repeated.

Thus the uniqueness of the design of HGA 10 according to the present invention is that although the pattern fill and pattern transfer capabilities are fully obtained, the dedicated pattern registers and associated program structures of the "prior art" module are not required. The pattern fill algorithm uses the gates already required to support other HGA function with a minor control modification to allow the FIFO to "roll over" to repeat the pattern. Thus the same functionality is available without the penalty of the four pattern registers, the 16 bit 4:1 MUX and pattern control and the 16 bit 2:1 E in the data path. Also, the pattern is easier to program since the pattern data doesn't have to be read from DRAM by the CPU and outputted to the pattern registers for each word of the pattern, The CPU only has to load the SRC address register in the HGA and then do the operation in the normal fashion.

While the invention has been particularly shown and described with reference to a preferred embodiment thereof, it will be understood by those skilled in the art that changes in form and detail may be made therein without departing from the spirit and the scope of the invention. For example, different implementations of the internal structure of the HGA and of its controlling software could be used as long as the normal and recirculating modes for operating the source data FIFO were preserved.

We claim:

1. A hardware graphics accelerator (HGA) system for a computer comprising, in combination:

source data memory means for storing source data defining an image to be graphically displayed;

logic means for reformatting and expanding said source data to form destination data compatible with a display device, said logic means comprising:

CPU interface means coupled to a CPU of said computer for receiving configuration and control information from said computer for an HGA operation; and configuration register means coupled to said CPU interface means for storing a source address pointer to indicate where said source data is located and for storing a destination address pointer for indicating where said destination data is located; and destination data memory means for storing said destination data;

said source data memory means operating in a recursive mode when said image to be graphically displayed comprises a repeating pattern element; and said source data memory means operating in a first-in-first-out mode when said image to be graphically displayed comprises any other image;

said source data memory means comprising:

source data FIFO memory coupled to said computer for storing said source data defining an image to be graphically displayed;

control means coupled to said source data FIFO memory for loading said source data into said source data FIFO memory, allowing said source data to be accessed in bursts of data, for repeatively outputting said source data when said source data memory means is operating in a recursive mode when said image to be graphically displayed comprises a repeating pattern element.

2. A hardware graphics accelerator system for a computer according to claim 1, said computer comprising a CPU, a DRAM, a memory controller and a graphics display.

3. A hardware graphics accelerator system for a computer according to claim 2, said source data FIFO memory coupled to said memory controller for storing said source data defining an image to be graphically displayed.

4. A hardware graphics accelerator system for a computer according to claim 3 further comprising a destination data FIFO memory coupled to said memory controller for storing destination data from a video frame buffer storage location within said DRAM.

5. A hardware graphics accelerator system for a computer according to claim 4, said logic means further comprising color expand means coupled to said source data FIFO means for expanding said source data to define a colored display element.

6. A hardware graphics accelerator system for a computer according to claim 5, said logic means further comprising rotate means coupled to said color expand means for aligning said source data to match the display position of said destination data.

7. A hardware graphics accelerator system for a computer according to claim 6, said logic means further comprising arithmetic logic unit means coupled to said rotate means and coupled to said destination data FIFO means for logically operating on said source and said destination data.

8. A hardware graphics accelerator system for a computer according to claim 7, said logic means further comprising color expand mask means coupled to said source data FIFO means, coupled to said arithmetic logic unit means, and coupled to said destination data FIFO means for masking out undesired portions of said destination data.

9. A hardware graphics accelerator system for a computer according to claim 8, said logic means further comprising output data register means coupled to said color expand mask means for storing the resultant version of said destination data.

10. A hardware graphics accelerator system for a computer according to claim 9, said logic means further comprising mask means coupled to said output data register means and coupled to said memory controller means making beginning scan line and ending scan line adjustments to said resultant version of said destination data.

11. A hardware graphics accelerator system for a computer according to claim 10, said CPU interface means coupled to said CPU and said memory controller for receiving configuration and control information for an HGA operation.

12. A hardware graphics accelerator system for a computer according to claim 11, said configuration register means further being coupled to said CPU interface means, said color expand means, said rotate means, said arithmetic logic unit means, said color expand mask means, said output data register means and said mask means for storing and transmitting the configuration data for an HGA operation.

13. A hardware graphics accelerator system for a computer according to claim 12, said logic means further comprising control means coupled to said configuration registers means, said source data FIFO means, said color expand means, said rotate means, said arithmetic logic unit means, said color expand mask means, said output data register means, said mask means and said memory controller for controlling the sequence of operations of said HGA.

14. A hardware graphics accelerator system for a computer according to claim 13, said logic means further comprising address generator means coupled to said configuration registers means, said control means and said memory controller for determining the destination addresses for said destination data.

15. A HGA Hardware Graphics Accelerator system for speeding up the graphics display of a computer system which includes a CPU, a DRAM and a memory controller comprising:

source data FIFO means coupled to said memory controller for storing the source data for a display element;

destination data FIFO means coupled to said memory controller and coupled to said source data FIFO for storing the destination data for a display element;

color expand means coupled to said source data FIFO means for expanding said source data to define a colored display element;

rotate means coupled to said color expand means for aligning said source data to match the display position of said destination data;

arithmetic logic unit means coupled to said rotate means and to said destination data FIFO means for logically operating on said source and said destination data;

color expand mask means coupled to said source data FIFO means, coupled to said arithmetic logic unit means, and coupled to said destination data FIFO means for masking out undesired portions of said destination data;

output data register means coupled to said color expand mask means for storing the resultant version of said destination data;

mask means coupled to said output data register means and coupled to said memory controller means for making beginning scan line and ending scan line adjustments to said resultant version of said destination data;

CPU interface means coupled to said CPU and said memory controller for receiving configuration and control information for an HGA operation;

configuration registers means coupled to said CPU interface means, said color expand means, said rotate means, said arithmetic logic unit means, said color expand mask means, said output data register means and said mask means for storing and transmitting the configuration data for an HGA operation;

control means coupled to said configuration registers means, said source data FIFO means, said color expand means, said rotate means, said arithmetic logic unit means, said color expand mask means, said output data register means, said mask means and said memory controller for controlling the sequence of operations of said HGA; and address generator means coupled to said configuration registers means, said control means and said memory controller for determining the destination addreeses for said destination data.

16. A method for making a hardware graphics accelerator (HGA) system for a computer comprising the steps of:

providing source data memory means for storing source data defining an image to be graphically displayed;

providing logic means for reformatting and expanding said source data to form destination data compatible with a display device, said logic means comprising:

CPU interface means coupled to a CPU of said computer for receiving configuration and control information from said computer for an HGA operation; and configuration register means coupled to said CPU interface means for storing a source address pointer to indicate where said source data is located and for storing a destination address pointer for indicating where said destination data is located; and providing destination data memory means for storing said destination data;

said source data memory means operating in a recursive mode when said image to be graphically displayed comprises a repeating pattern element; and said source data memory means operating in a first-in-first-out mode when said image to be graphically displayed comprises any other image;

said source data memory means comprising:

source data FIFO memory coupled to said computer for storing said source data defining an image to be graphically displayed;

control means coupled to said source data FIFO memory for loading said source data into said source data FIFO memory, allowing said source data to be accessed in bursts of data, for repeatively outputting said source data when said source data memory means is operating in a recursive mode when said image to be graphically displayed comprises a repeating pattern element.

17. A method for making a hardware graphics accelerator system for a computer according to claim 16, comprising the step of providing said computer comprising a CPU, a DRAM, a memory controller and a graphics display.

18. A method of making hardware graphics accelerator system for a computer according to claim 17, further comprising the step of providing said source data FIFO memory coupled to said memory controller for storing said source data defining an image to be graphically displayed.

19. A method for making a hardware graphics accelerator system for a computer according to claim 18 further comprising the step of providing a destination data FIFO memory coupled to said memory controller for storing destination data from a video frame buffer storage location within said DRAM.

20. A method making a hardware graphics accelerator system for a computer according to claim 19, comprising the step of providing said logic means further comprising color expand means coupled to said source data FIFO means for expanding said source data to define a colored display element.

21. A method for making a hardware graphics accelerator system for a computer according to claim 20, comprising the step of providing said logic means further comprising rotate means coupled to said color expand means for aligning said source data to match the display position of said destination data.

22. A method for making a hardware graphics accelerator system for a computer according to claim 21, comprising the step of providing said logic means further comprising arithmetic logic unit means coupled to said rotate means and coupled to said destination data FIFO means for logically operating on said source and said destination data.

23. A method making a hardware graphics accelerator system for a computer according to claim 22, comprising the step of providing said logic means further comprising color expand mask means coupled to said source data FIFO means, coupled to said arithmetic logic unit means, and coupled to said destination data FIFO means for masking out undesired portions of said destination data.

24. A method for making a hardware graphics accelerator system for a computer according to claim 23, comprising the step of providing said logic means further comprising output data register means coupled to said color expand mask means for storing the resultant version of said destination data.

25. A method for making a hardware graphics accelerator system for a computer according to claim 24, comprising the step of providing said logic means further comprising mask means coupled to said output data register means and coupled to said memory controller means for making beginning scan line and ending scan line adjustments to said resultant version of said destination data.

26. A method for making a hardware graphics accelerator system for a computer according to claim 25, further comprising the step of providing said CPU interface means coupled to said CPU and said memory controller for receiving configuration and control information for an HGA operation.

27. A method for making a hardware graphics accelerator system for a computer according to claim 16, further comprising the step of providing said configuration register means further being coupled to said CPU interface means, said color expand means, said rotate means, said arithmetic logic unit means, said color expand mask means, said output data register means and said mask means for storing and transmitting the configuration data for an HGA operation.

28. A method for making a hardware graphics accelerator system for a computer according to claim 27, comprising the step of providing said logic means further comprising control means coupled to said configuration registers means, said source data FIFO means, said color expand means, said rotate means, said arithmetic logic unit means, said color expand mask means, said output data register means, said mask means and said memory controller for controlling the sequence of operations of said HGA.

29. A method for making a hardware graphics accelerator system for a computer according to claim 28, comprising the step of providing said logic means further comprising address generator means coupled to said configuration registers means, said control means and said memory controller for determining the destination addresses for said destination data.

30. A method for making a HGA Hardware Graphics Accelerator system for speeding up the graphics display of a computer system which includes a CPU, a DRAM and a memory controller comprising the steps of:

providing source data FIFO means coupled to said memory controller for storing the source data for a display element;

providing destination data FIFO means coupled to said memory controller and coupled to said source data FIFO for storing the destination data for a display element;

providing color expand means coupled to said source data FIFO means for expanding said source data to define a colored display element;

providing rotate means coupled to said color expand means for aligning said source data to match the display position of said destination data;

providing arithmetic logic unit means coupled to said rotate means and to said destination data FIFO means for logically operating on said source and said destination data;

providing color expand mask means coupled to said source data FIFO means, coupled to said arithmetic logic unit means, and coupled to said destination data FIFO means for masking out undesired portions of said destination data;

providing output data register means coupled to said color expand mask means for storing the resultant version of said destination data;

providing mask means coupled to said output data register means and coupled to said memory controller means for making beginning scan line and ending scan line adjustments to said resultant version of said destination data;

providing CPU interface means coupled to said CPU and said memory controller for receiving configuration and control information for an HGA operation;

providing configuration registers means coupled to said CPU interface means, said color expand means, said rotate means, said arithmetic logic unit means, said color expand mask means, said output data register means and said mask means for storing and transmitting the configuration data for an HGA operation;

providing control means coupled to said configuration registers means, said source data FIFO means, said color expand means, said rotate means, said arithmetic logic unit means, said color expand mask means, said output data register means, said mask means and said memory controller for controlling the sequence of operations of said HGA; and providing address generator means coupled to said configuration registers means, said control means and said memory controller for determining the destination addresses for said destination data.

* * * * *